(12) United States Patent
Choi et al.

(10) Patent No.: US 12,361,733 B2
(45) Date of Patent: Jul. 15, 2025

(54) APPARATUS AND METHOD WITH OBJECT DETECTION

(71) Applicant: SAMSUNG ELECTRONICS CO., LTD., Suwon-si (KR)

(72) Inventors: Jinhyuk Choi, Hwaseong-si (KR); Seho Shin, Seoul (KR); ByeongJu Lee, Seoul (KR); Sung Hyun Chung, Osan-si (KR); Dae Hyun Ji, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 440 days.

(21) Appl. No.: 17/862,704

(22) Filed: Jul. 12, 2022

(65) Prior Publication Data

US 2023/0048497 A1 Feb. 16, 2023

(30) Foreign Application Priority Data

Jul. 29, 2021 (KR) .......................... 10-2021-0099574
Sep. 17, 2021 (KR) .......................... 10-2021-0125081

(51) Int. Cl.
*G06V 20/70* (2022.01)
*G06V 10/776* (2022.01)
*G06V 10/82* (2022.01)
*G06V 20/58* (2022.01)

(52) U.S. Cl.
CPC ............ *G06V 20/70* (2022.01); *G06V 10/776* (2022.01); *G06V 10/82* (2022.01); *G06V 20/58* (2022.01)

(58) Field of Classification Search
CPC ........ G06V 20/70; G06V 20/58; G06V 10/82; G06V 10/776; G06N 20/20; G06N 3/096
See application file for complete search history.

(56) References Cited

U.S. PATENT DOCUMENTS

| | | |
|---|---|---|
| 9,189,538 B2 | 11/2015 | King et al. |
| 2018/0348784 A1 | 12/2018 | Zheng et al. |
| 2020/0125899 A1 | 4/2020 | Lee et al. |

FOREIGN PATENT DOCUMENTS

| | | |
|---|---|---|
| CN | 111539474 A | 8/2020 |
| JP | 2019-79089 A | 5/2019 |
| JP | 2020-135011 A | 8/2020 |

OTHER PUBLICATIONS

Reconfiguring the Imaging Pipeline for Computer Vision by Mark Buckler et al.; Published Aug. 1, 2017 by arXiv (Year: 2017)*

(Continued)

*Primary Examiner* — Gregory A Morse
*Assistant Examiner* — Ty M Beatty
(74) *Attorney, Agent, or Firm* — NSIP Law

(57) ABSTRACT

Disclosed is an apparatus and method with object detection. The method may include updating a pre-trained model based on sensing data of an image sensor, performing pseudo labeling using an interim model provided a respective training set, determining plural confidence thresholds based on an evaluation of the interim model, performing multiple trainings using the interim model and the generated pseudo labeled data, by applying the determined plural confidence thresholds to the multiple trainings, respectively, and generating an object detection model dependent on the performance of the multiple trainings, including generating an initial candidate object detection model when the interim model is the updated model.

26 Claims, 11 Drawing Sheets

(56) References Cited

OTHER PUBLICATIONS

Generalization of intensity distribution of medical images using GANs by Dong-Ho Lee et al.; Published Apr. 25, 2020 by Hum. Cent. Comput. Inf. Sci. (Year: 2020)*

Improving Dataset Volumes and Model Accuracy With Semi-Supervised Iterative Self-Learning by Robert Dupre et al.; Published May 6, 2019 (Year: 2019)*

Multi-scale object detection in remote sensing imagery with convolutional neural networks by Zhipeng Deng et al.; Published Oct. 5, 2018 by ISPRS Journal of Photogrammetry and Remote Sensing (Year: 2018)*

Interactive Self-Training with Mean Teachers for Semi-supervised Object Detection by Qize Yang et al,; Published Jun. 20-25, 2021 by Conference on Computer Vision and Pattern Recognition (CVPR) (Year: 2021)*

Deep learning for object detection and scene perception in self-driving cars: Survey, challenges, and open issues by Abhishek Gupta et al,; Published Feb. 23, 2021 by Array (Year: 2021)*

Casado-GarcÃa, Ãngela, and JÃ³nathan Heras. "Ensemble methods for object detection." ECAI 2020. IOS Press, 2020. 2688-2695. (Year: 2020)*

Extended European search report issued on Dec. 20, 2022, in counterpart European Patent Application No. 22183588.7 (9 pages in English).

\* cited by examiner

APPARATUS AND METHOD WITH OBJECT DETECTION

CROSS-REFERENCE TO RELATED APPLICATIONS

This application claims the benefit under 35 USC § 119(a) of Korean Patent Application No. 10-2021-0099574, filed on Jul. 29, 2021, and Korean Patent Application No. 10-2021-0125081, filed on Sep. 17, 2021, in the Korean Intellectual Property Office, the entire disclosures of all of which are incorporated herein by reference for all purposes.

BACKGROUND

1. Field

The following description relates to an apparatus and method with object detection.

2. Description of Related Art

An object detection model may be generated through a labeling operation of assigning a label to an object in an image using deep learning, and operation of training the object detection model using the labeled image. The labeling operation requires a lot of time and resources, and it may take a long time until the object detection model is generated. The labeling and training of the object detection model may be dependent on the characteristics of the particular image sensor that captures the image, and further dependent on any image signal processing performed on the raw data of the captured image.

When a new image sensor is introduced, a new object detection model corresponding to the new image sensor may be required, and thus, these labeling and training operations typically need to be performed anew to generate the new the object detection model corresponding to the new image sensor.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method includes updating a pre-trained model based on sensing data of an image sensor, performing pseudo labeling using an interim model provided a respective training set, determining plural confidence thresholds based on an evaluation of the interim model, performing multiple trainings using the interim model and the generated pseudo labeled data, by applying the determined plural confidence thresholds to the multiple trainings, respectively, and generating an object detection model dependent on the performance of the multiple trainings, including generating an initial candidate object detection model when the interim model is the updated model.

The updating of the pre-trained model may include updating a first layer of the pre-trained model using the sensing data.

The first layer may be a batch normalization layer.

The updating of the pre-trained model may include performing image adaptation on the sensing data.

The performing of the image adaptation on the sensing data may include adjusting an intensity distribution of the sensing data.

The pre-trained model may be based on corresponding sensing data in a different format than the sensing data, and the updating of the pre-trained model may include converting the sensing data into the different format.

Each of the multiple trainings may include an implementing of the interim model, provided the generated pseudo labeled data, using a different confidence threshold, of the determined plural confidence thresholds, for obtaining a respective labeling result of the implemented interim model, and each of the multiple trainings may include additional training based at least on the respective labeling result.

The pre-trained model may be based on sensing data of another image sensor having different characteristics than the image sensor.

The multiple trainings may be collectively repeated a plurality of times, after an initial time of the plurality of times when the interim model may be the updated model, with the interim model being a previous candidate object detection model generated, in the generating of the object detection model, at an immediately previous time of the plurality of times, where the generating of the object detection model may further include generating another candidate object detection model at a final time of the plurality of times, and where the previous candidate object detection model at a time immediately after the initial time may be the initial candidate object detection model.

The generating of the object detection model may include selecting the object detection model from among plural candidate object detection models based on performance comparisons between the plural candidate object detection models, where the plural candidate object detection models may include the initial candidate object detection model, the previous candidate object detection models respectively generated at the plurality times, except at a time of the plurality of times immediately after the initial time, and the other candidate object detection model.

The method may further include performing, by a vehicle, object detection using the generated object detection model provided an image captured by the image sensor.

The evaluating of the interim model may include determining a plurality of evaluation scores from respective implementations of the interim model using a plurality of thresholds and a respective validation set, and the determining of the plural confidence thresholds may include determining a first confidence threshold, of the plural confidence thresholds, used to determine a highest evaluation score of the determined evaluation scores, determining a second confidence threshold, of the plural confidence thresholds, greater than the determined first confidence threshold, and determining a third confidence threshold, of the plural confidence thresholds, less than the determined first confidence threshold.

The multiple trainings at each of the plurality of times may have respective trained model results, where, at each of the plurality of times, the generating of the object detection model may generate a corresponding candidate object detection model by performing an ensemble of the respective trained model results.

The generating of the object detection model may include generating the initial candidate object detection model by performing an ensemble of the respective model results of the multiple trainings when the interim model may be the updated model.

The evaluating of the interim model may include determining a plurality of evaluation scores from respective implementations of the interim model using a plurality of thresholds and a respective validation set, and the determining of the plural confidence thresholds may include determining a first confidence threshold, of the plural confidence thresholds, used to determine a highest evaluation score of the determined evaluation scores, determining a second confidence threshold, of the plural confidence thresholds, greater than the determined first confidence threshold, and determining a third confidence threshold, of the plural confidence thresholds, less than the determined first confidence threshold.

The performing of the multiple trainings may include performing a first training to which the determined first confidence threshold may be applied using the interim model and the generated pseudo labeled data, performing a second training to which the determined second confidence threshold may be applied using the interim model and the generated pseudo labeled data, and performing a third training to which the determined third confidence threshold may be applied using the interim model and the generated pseudo labeled data.

The performing of the pseudo labeling using the interim model may include generating first pseudo labeled data by performing the pseudo labeling based on the updated model and a first unlabeled training set as the respective training set, and generating second pseudo labeled data by performing the pseudo labeling based on the initial object detection model and a second unlabeled training set as the respective training set, evaluating the initial candidate object detection model, determining confidence thresholds for the generated second pseudo labeled data based on a result of evaluating the initial candidate object detection model, performing multiple second trainings, among the multiple trainings, using the initial candidate object detection model and the generated second pseudo labeled data, by applying the confidence thresholds for the generated second pseudo labeled data to the multiple second trainings, respectively, and generating, in the generating the object detection model, a second candidate object detection model using results of the multiple second trainings, where the first unlabeled training set and the second unlabeled training set may be same or different training sets.

The method may further include repeating a plurality of times, after the generating of the initial candidate object detection model and except for an initial time of the plurality of times when the second candidate object detection model is generated.

The performing of the pseudo labeling using, as the interim model at a corresponding time of the plurality of times, a previous candidate object detection model generated, in the generating of the object detection model, at an immediately previous time of the plurality of times, the evaluating of the interim model, at the corresponding time, the performing of the multiple trainings, at the corresponding time, with respect to the interim model, and a generating, in the generating the object detection model at the corresponding time, another candidate object detection model based on results of the multiple trainings at the corresponding time, and generating the object detection model by selecting the object detection model from among plural candidate object detection models based on performance comparisons between the plural candidate object detection models, where the plural candidate object detection models include the initial candidate object detection model, the previous candidate object detection models at the immediately previous times, and the other candidate object detection model at a final time of the plurality of times.

In one general aspect, an apparatus includes a memory configured to store an object detection model, and a processor configured to perform object detection using an image from an image sensor and the object detection model, where, for the generation of the object detection model, the processor is configured to update a pre-trained model based on sensing data of the image sensor, perform pseudo labeling using an interim model provided a respective training set, to generate pseudo labeled data, determine plural confidence thresholds based on an evaluation of the interim model, perform multiple trainings using the interim model and the generated pseudo labeled data, by applying the determined plural confidence thresholds to the multiple trainings, respectively, and generate the object detection model dependent on the performance of the multiple trainings, including generating a candidate object detection model when the interim model is the updated model.

The update of the pre-trained model may include updating a first layer of the pre-trained model using sensing data of another image sensor that has same characteristics as the image sensor.

The first layer may be a batch normalization layer.

The update of the pre-trained model may include performing image adaptation on the sensing data.

The processor may be further configured to perform the evaluation by determining a plurality of evaluation scores for the interim model using a plurality of thresholds and a respective validation set, and the determination of the confidence thresholds may include a determination of a first confidence threshold used to determine a highest evaluation score of the determined evaluation scores, a determination of a second confidence threshold greater than the determined first confidence threshold, and a determination of a third confidence threshold less than the determined first confidence threshold.

For the performing of the multiple trainings, the processor may be configured to perform a training to which the determined first confidence threshold may be applied using the interim model and the generated pseudo labeled data, perform a training to which the determined second confidence threshold may be applied using the interim model and the generated pseudo labeled data, and perform a training to which the determined third confidence threshold may be applied using the interim model and the generated pseudo labeled data.

The generation of the object detection model may include generating the candidate object detection model by performing an ensemble of respective model results of the plurality of trainings.

The processor may be further configured to adjust an intensity distribution of the image using the object detection model.

The apparatus may further include the image sensor.

The apparatus may be a vehicle.

In one general aspect, an apparatus includes a processor, and a memory storing instructions, where, for generating an object detection model, execution of the instructions configure the processor to generate pseudo labeled data using an interim model provided respective training data, perform multiple trainings, with each of the trainings including an implementing of the interim model, provided the pseudo labeled data, using a different confidence threshold of a plurality of confidence thresholds, for obtaining a respective labeling result dependent on results the implemented interim model, and additional training based at least on the respective labeling result, and generate an object detection model dependent on the performance of the multiple trainings, including generation of an initial candidate object detection model when the interim model is a pre-trained object detection model having been modified based on sensing data of an image sensor.

The processor may be further configured to evaluate the interim model by determining a plurality of evaluation scores for the interim model provided a respective validation set, and determine a first confidence threshold, of the plurality of confidence thresholds, used to determine a highest evaluation score of the determined evaluation scores.

The multiple may be collectively repeated a plurality of times, after an initial time of the plurality of times when the interim model may be the pre-trained object detection model having been modified, with the interim model being a previous candidate object detection model generated, in the generating of the object detection model, at an immediately previous time of the plurality of times, and the generation of the object detection model may further include generation of another candidate object detection model at a final time of the plurality of times.

The multiple trainings at each of the plurality of times may have respective trained model results, where, at each of the plurality of times, the generating of the object detection model may include generating a corresponding candidate object detection model by performing an ensemble of the respective trained model results, where plural candidate object detection models may include the initial candidate object detection model, the previous candidate object detection models respectively at the plurality times, except at a time of the plurality of times immediately after the initial time, and the other candidate object detection model, and the generating of the object detection model may include selecting the object detection model from among the plural candidate object detection models based on performance comparisons between the plural candidate object detection models.

The apparatus may be a vehicle and may further include the image sensor,

The processor may be further configured to perform object detection of an image, captured by the image sensor of an exterior of the vehicle, using the generated object detection model, and the processor, or another processor comprised in the vehicle, may be configured to control operation of the vehicle based on a result of the performed object detection.

The apparatus may further include a display, where the processor may be further configured to adjust an intensity distribution of the image using the object detection model and control a displaying of the image with the adjusted intensity distribution using the display.

The processor may be further configured to perform the modification of the interim model by updating a batch normalization layer of the interim model using the sensing data.

Other features and aspects will be apparent from the following detailed description, the drawings, and the claims.

Figure 1:
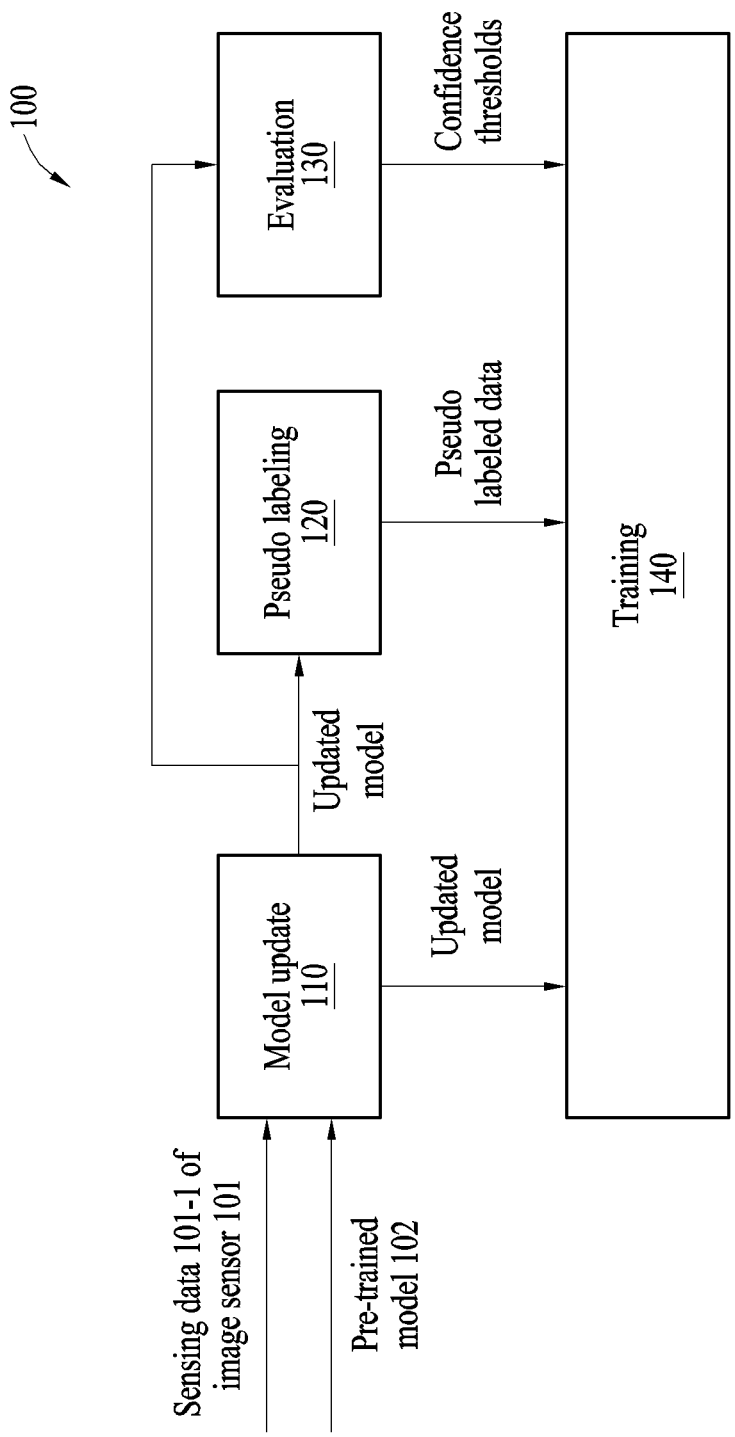
FIG. 1 illustrates an example object detection model generating method, according to one or more embodiments.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

Herein, an "object" may be a target to be detected from an image, such as a person or a thing. The various types (classes) of the "object" to be detected may be defined in advance as various preset types, e.g., a person type, a vehicle type, an animal type, etc., as well as various sub-types of the same, noting that examples are not limited to only such various types.

An object detection model may be or include a deep convolutional neural network (DCNN). As a non-limiting example, the DCNN may include one or more convolutional layers, one or more pooling layers, and one or more fully connected layers. Here, the DCNN is provided as merely an example, and the object detection model may be or include a neural network or other machine learning model having a structure other than the DCNN.

FIG. 1 illustrates an example object detection model generating method, according to one or more embodiments.

Referring to FIG. 1, a computing apparatus 100 that may perform model update 110, pseudo labeling 120, evaluation 130, and training 140, for example.

In FIG. 1, an image sensor 101 may be a new image sensor. Sensing data 101-1 of the image sensor 101 may be unlabeled data. The sensing data 101-1 may also be referred to as an image or image data, as a non-limiting example.

The computing apparatus 100 may perform model update 110 using the sensing data 101-1 of the image sensor 101 and a pre-trained model 102. The pre-trained model 102 may be a model trained based on labeled data of a previous image sensor, or a model for detecting an object from sensing data of the previous image sensor. The computing apparatus 100 may update the pre-trained model 102 using the sensing data 101-1 of the image sensor 101. An example model update 110 will be described in greater detail below with reference to FIG. 2. For example, when the apparatus 100 is a vehicle, the previous image sensor may be mounted in or on the vehicle, the memory of the vehicle may store the pre-trained model 102, and a method may include replacing that previous image sensor with the image sensor 101, and generate and store a new trained object detection model based on the pre-trained model 101, and perform object detection by the vehicle using the image sensor 101 and the new trained object detection model.

The computing apparatus 100 may perform pseudo labeling 120 using the model updated through model update 110 and a training set, e.g., a respective training set for this case of performing pseudo labeling 120 using the updated model. The training set may be a data set obtained by the image sensor 101. As will be described in greater detail below with reference to FIG. 3, the updated model may generate pseudo labeled data by inputting the training set to the updated model and performing inference operations with respect to the training set to generate respective labeling results for the training set, referred to as the pseudo labeled data.

The computing apparatus 100 may perform evaluation 130 of the model updated through model update 110, and determine confidence thresholds for the pseudo labeled data based on a result of evaluation. The confidence thresholds may have different values. An example evaluation 130 will be described in greater detail below with reference to FIG. 4.

The computing apparatus 100 may perform a plurality of trainings using the updated model and the pseudo labeled data. Herein, such plurality of trainings may also be referred to as multiple trainings using an interim model, e.g., wherein this case the interim model would be the updated model, while in other cases the interim model may be a generated model based on model results of the multiple trainings. Such a generated model with respect to the updated model may also be referred to as an initial candidate model, while subsequent generated models based on a repetition of the multiple trainings collectively a plurality of times, such as described below with respect to FIGS. 5 and 6, may be referred to as respective candidate models, e.g., candidate object detection models at each of the plurality of times after the generation of the initial candidate model. Likewise, as discussed further below, for each of the collective repetitions of the multiple trainings, e.g., at corresponding times of the plurality of times, each of the pseudo labeling, the evaluation of the interim model, the determining of the plural confidence values may also be repeated with respect to which model is represented by the interim model at the corresponding time, e.g., a previous candidate object detection model generated at an immediately previous time. In an example, and as will be discussed further below with respect to FIG. 5, at an immediately next time after the generation of the initial candidate object detection model the interim model may be the immediately previous candidate object detection model. For example, with respect to FIG. 5 this immediately previous candidate object detection model, i.e., the corresponding interim model at that time, would be the initial candidate object detection model, while in FIG. 6 the immediately previous candidate model would be the candidate object detection model generated with respect to FIG. 5.

Returning to the case of the performing of the plurality of trainings with respect to the updated model, the computing apparatus 100 may perform a plurality of trainings by applying the confidence thresholds to the plurality of trainings, respectively. The computing apparatus 100 may generate an object detection model (hereinafter, referred to as "object detection model₁" for ease of description) using results of the plurality of trainings.

The computing apparatus 100 may generate an object detection model₂ by performing pseudo labeling 120, evaluation 130, and training 140 on the object detection model₁, and generate an object detection model₃ by performing pseudo labeling 120, evaluation 130, and training 140 on the object detection model₂. In this way, the computing apparatus 100 may generate a plurality of object detection models, and determine an object detection model having a best or maximum performance of the plurality of object detection models, e.g., to desirably be the primary object detection model for the image sensor 101.

Figure 2:
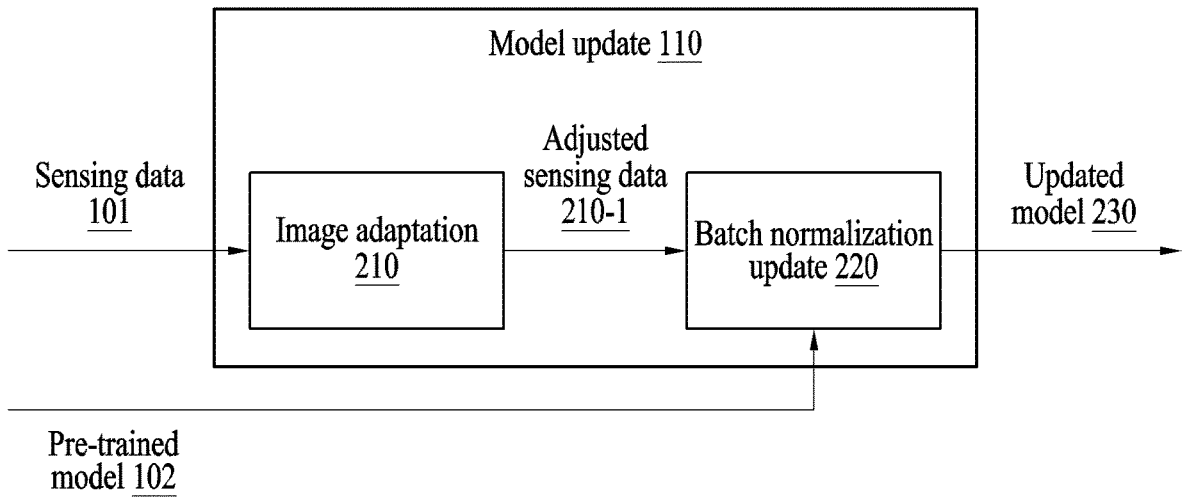
FIG. 2 illustrates an example updating of a model in an object detection model generating method, according to one or more embodiments.

FIG. 2 illustrates an example updating of a model in an object detection model generating method, according to one or more embodiments.

Referring to FIG. 2, a computing apparatus 100 may perform image adaptation 210 and batch normalization update 220, for example. As an example, the computing apparatus 100 may be any one or any combination of the computing apparatuses 100 described herein, and may further be any one or any combination of any of the computing apparatuses described herein.

The computing apparatus 100 may adjust (or change) a distribution, e.g., intensity distribution, of sensing data 101-1, e.g., sensing data 101-1 of FIG. 1, by performing image adaptation 210 on the sensing data 101-1. The distribution of the sensing data 101-1 may be different from a distribution of a data set used for training a pre-trained model 102, such as the pre-trained model 102 of FIG. 1. For example, the sensing data 101-1 may be RA1B RAW data (16-bit, 1-channel, 7.4 Mpixel), and the data set that had been used for training the pre-trained model 102 may be RGB data (8-bit, 3-channel, 1 Mpixel) processed through an image signal processor (ISP).

For smooth pseudo labeling 120, e.g., the pseudo labeling 120 of FIG. 1, the distribution of the sensing data 101-1 may be similar to the distribution of the data set used for training the pre-trained model 102. For example, to reduce a difference between the distribution of the sensing data 101-1 and the distribution of the data set used for training the pre-trained model 102, the computing apparatus 100 may adjust the distribution of the sensing data 101-1. For example, the computing apparatus 100 may adjust the intensity distribution of the sensing data 101-1 through the below example Equation 1.

Equation 1 if $I_{avg} < I_{thr}^{low}$ and $2^\mu \leq I_{avg} < 2^{\mu+1}$: $I_{xy} = I_{xy} << (\alpha-\mu+1)$ (1)

if $I_{avg} > I_{thr}^{high}$ and $2^\theta \leq I_{avg} < 2^{\theta+1}$: $I_{xy} = I_{xy} >> (\theta-\beta)$ (2)

$0 < I < 65536$, about 16 bit RAW data
$I_{thr}^{low} = 2^\alpha$, $\alpha = 11$, $0 \leq \mu < 11$
$I_{thr}^{high} = 2^\beta$, $\beta = 14$, $14 \leq \theta < 16$ In Equation 1 above, $I_{avg}$ denotes an average intensity of the sensing data 101-1, $I_{thr}^{low}$ denotes a lower threshold, and $I_{thr}^{high}$ denotes an upper threshold.

When an image sensor 101, e.g., the image sensor 101 of FIG. 1, collects the sensing data 101-1 in a low-intensity situation, e.g., situation in which a vehicle drives in a tunnel or drives at night, the computing apparatus 100 may adjust the intensity distribution of the sensing data 101-1 to be relatively high through (1) of Equation 1.

When the image sensor 101 collects the sensing data 101-1 in a high-intensity situation, e.g., situation in which a vehicle drives during the daytime, the computing apparatus 100 may adjust the intensity distribution of the sensing data 101-1 to be relatively low through (2) of Equation 1.

The computing apparatus 100 may perform batch normalization update 220 on the pre-trained model 102 based on adjusted sensing data 210-1. More specifically, the computing apparatus 100 may update a batch normalization layer of the pre-trained model 102 through the adjusted sensing data 210-1. As an example, the computing apparatus 100 may update a mean and a variance of a batch through the below example Equation 2. Through this, the computing apparatus 100 may update the batch normalization layer of the pre-trained model 102 to match the adjusted sensing data 210-1.

Equation 2

Input: Values of $x$ over a batch: $\{x_1 \ldots m\}$ (3)

Ouput: batch mean $\mu$, batch variance $\delta^2$ $$\mu \leftarrow \frac{1}{m}\sum_{i=1}^{m} x_i // \text{batch mean}$$

$$\delta^2 \leftarrow \frac{1}{m}\sum_{i=1}^{m}(x_i - \mu)^2 // \text{batch variance} \quad (4)$$

At this stage, when updating the batch normalization layer, the computing apparatus 100 may not update values, e.g., weights in the pre-trained model 102, other than the mean and the variance of the batch, e.g., the computing apparatus 100 may update only the batch normalization layer of the pre-trained model 102 to match the adjusted sensing data 210-1.

For example, the sensing data 101-1 may be converted into the format of the data set used to update the pre-trained model 102. The batch normalization layer of the pre-trained model 102 may be updated through the sensing data with the format converted. For example, the sensing data 101-1 may be raw data, but the data set that was used to previously train the pre-trained model 102 may have been in the RGB format, as only an example, so sensing data 101-1 may be converted into the RGB format, and the batch normalization layer of the pre-trained model 102 updated using the converted sensing data in the RGB format to generate the updated model 230.

Figure 3:
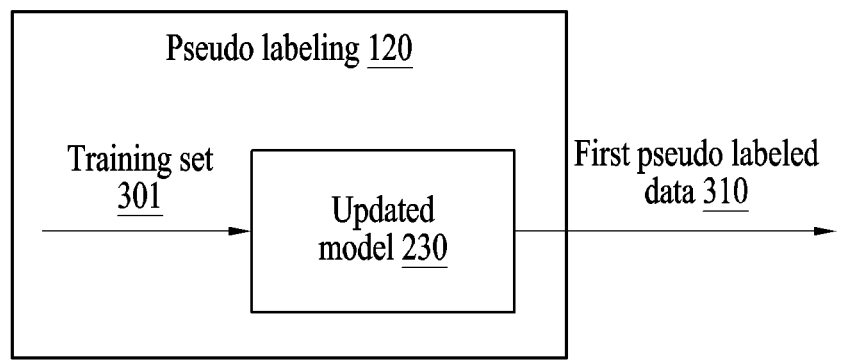
FIG. 3 illustrates an example pseudo labeling in an object detection model generating method, according to one or more embodiments.

FIG. 3 illustrates an example pseudo labeling in an object detection model generating method, according to one or more embodiments.

Referring to FIG. 3, a computing apparatus 100 may input a training set 301 into an updated model 230, e.g., the updated model 230 of FIG. 2, for example. As an example, the computing apparatus 100 may be any one or any combination of the computing apparatuses 100 described herein, and may further be any one or any combination of any of the computing apparatuses described herein. The training set 301 may be a data set acquired by an image sensor 110, e.g., the image sensor 110 of FIG. 1. The training set 301 may be an unlabeled data set. In other words, the training set 301 may include unlabeled images.

The updated model 230 may generate first pseudo labeled data 310 by performing inference operations for on the input training set 301 input to the updated model 230. The updated model 230 may determine at least a bounding box in each of the images in the input training set 301, and calculate per-class probability values for the bounding box of each image. For example, the updated model 230 may determine a bounding $box_A$ in an $image_A$ in the input training set 301, calculate per-class probabilities, e.g., a probability of belonging to a vehicle class, a probability of belonging to a human class, a probability of belonging to an animal class, etc., for the bounding $box_A$, and assign the calculated per-class probabilities as pseudo labels for the bounding $box_A$. This may be performed for each $image_A$ in the input training set 301.

Figure 4:
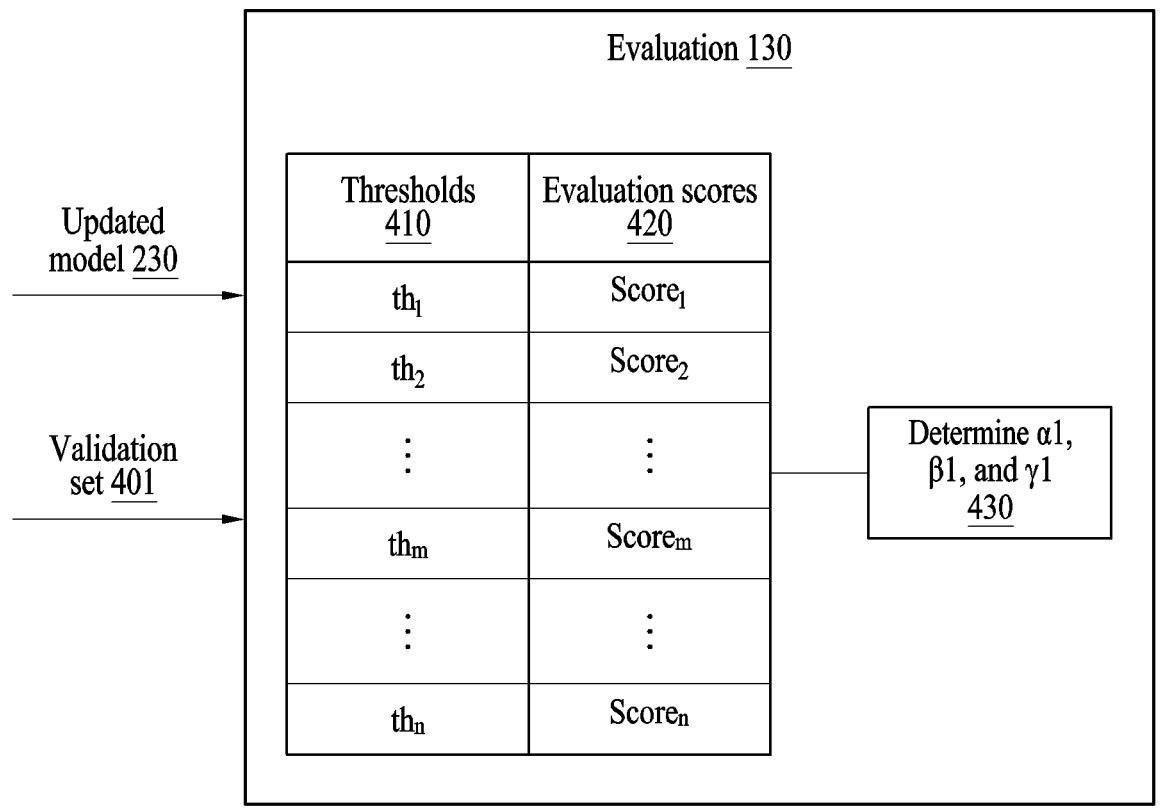
FIG. 4 illustrates an example evaluation in an object detection model generating method, according to one or more embodiments.

FIG. 4 illustrates an example evaluation in an object detection model generating method, according to one or more embodiments.

Referring to FIG. 4, a computing apparatus 100 may perform an evaluation 130, e.g., evaluation 130 of FIG. 1, on an updated model 230, e.g., the updated model 230 of FIG. 2, for example. As an example, the computing apparatus 100 may be any one or any combination of the computing apparatuses 100 described herein, and may further be any one or any combination of any of the computing apparatuses described herein. In the example shown in FIG. 4, the computing apparatus 100 may determine a plurality of evaluation scores 420, e.g., F1 scores, for the updated model 230 using a plurality of thresholds 410 and a validation set 401. The validation set 401 may include a data set obtained through an image sensor 101, e.g., the image sensor 101 of FIG. 1. The validation set 401 may be a labeled data set, e.g., a pre-labeled data set. In other words, the validation set 401 may include already labeled images.

The computing apparatus 100 may apply a threshold $th_1$ to the updated model 230. The updated model 230 to which the threshold $th_1$ is applied may generate an object detection result upon receiving the validation set 401. As an example, the updated model 230 may determine a bounding $box_1$ in an $image_1$ in the validation set 401, calculate per-class probabilities for the bounding $box_1$, and select an object in the bounding $box_1$ as a final detection result when a highest probability of the calculated per-class probabilities is greater than or equal to the threshold $th_1$. The computing apparatus 100 may classify an object detection result of the updated model 230 as false positive (FP), false negative (FN), true positive (TP), or true negative (TN) for the threshold $th_1$. The computing apparatus 100 may calculate a precision and a recall for the threshold $th_1$ through the classification result, and calculate a $score_1$ using the precision and the recall. The $score_1$ may be, for example, but not limited to, an F1 score.

Similarly, the computing apparatus 100 may calculate evaluation scores for the updated model 230 respectively when the other thresholds $th_2, \ldots, th_n$ are applied. As in the example shown in FIG. 4, the computing apparatus 100 may calculate a $score_2$, e.g., F1 $score_2$, for the threshold $th_2$, a $score_m$, e.g., F1 $score_m$, for the threshold $th_m$, a $score_n$, e.g., F1 $score_n$, for the threshold $th_n$.

The computing apparatus 100 may determine a threshold used to determine a highest evaluation score of the plurality of evaluation scores 420 to be a first confidence threshold $\beta_1$, determine a second confidence threshold $\alpha_1$ greater than the first confidence threshold, and determine a third confidence threshold $\gamma_1$ smaller than the first confidence threshold. As an example, the computing apparatus 100 may determine the first to third confidence thresholds $\beta_1$, $\alpha_1$, and $\gamma_1$ through the below example Equation 3.

Equation 3:

$\beta$: optimal detection threshold $\alpha$: $\beta+0.1+\varepsilon$ $\gamma$: $\beta-0.1+\varepsilon$ (5)

In Equation 3 above, optimal detection threshold denotes a threshold used for determining the highest evaluation score described above. $\varepsilon$ denotes a constant.

Of the first to third confidence thresholds $\beta_1$, $\alpha_1$ and $\gamma_1$, the second confidence threshold $\alpha_1$ is the largest, and the third confidence threshold $\gamma_1$ is the smallest.

Figure 5:
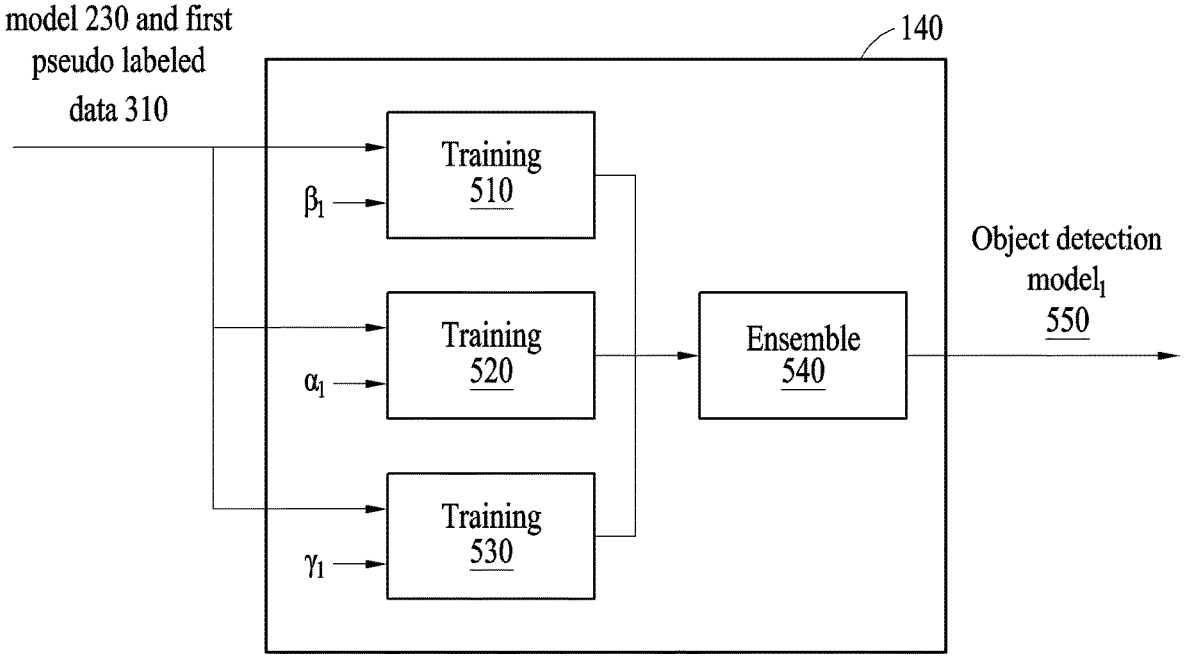
FIGS. 5 and 6 illustrate example training in an object detection model generating method, according to one or more embodiments.
Figure 6:
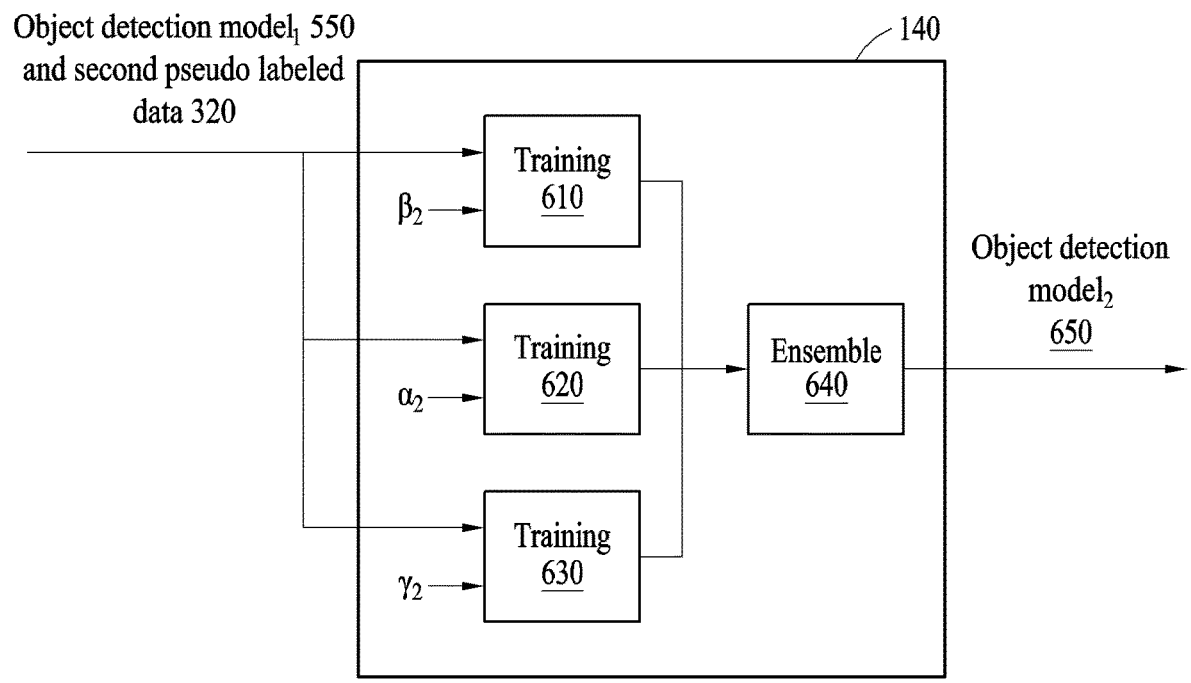

FIGS. 5 and 6 illustrate an example training in an object detection model generating method, according to one or more embodiments.

Referring to FIG. 5, a computing apparatus 100 may perform a plurality of trainings 510, 520, and 530 using an updated model 230 and first pseudo labeled data 310. As an example, the computing apparatus 100 may be any one or any combination of the computing apparatuses 100 described herein, and may further be any one or any combination of any of the computing apparatuses described herein. In examples, the updated model 230 may be the updated model 230 of FIG. 2, and the first pseudo labeled data 310 may be first pseudo labeled data 310 of FIG. 3. In an example, the computing apparatus 100 may independently perform the plurality of trainings 510, 520, and 530, and apply confidence thresholds $\beta_1$, $\alpha_1$, and $\gamma_1$ according to Equation 3, for example, to the plurality of trainings 510, 520, and 530, respectively when performing the plurality of trainings 510, 520, and 530. The computing apparatus 100 may generate an object detection $model_1$ 550 by performing an ensemble 540 of the results of the trainings 510, 520, and 530. Hereinafter, training 140 of FIG. 5 will be described in greater detail. In an example, the training 140 may be the training 140 of FIG. 1.

The computing apparatus 100 may perform training 510 to which the first confidence threshold $\beta_1$ is applied, using the updated model 230 and the first pseudo labeled data 310. For example, the computing apparatus 100 may perform training 510 of the updated model 230 through an image having a resulting pseudo label, e.g., a highest probability among the per-class probabilities being a particular pseudo label among all label classes, greater than or equal to the first confidence threshold $\beta_1$ among the plurality of images in the first pseudo labeled data 310. Of the confidence thresholds $\beta_1$, $\alpha_1$, and $\gamma_1$, the first confidence threshold $\beta_1$ is the median. In training 510 to which the first confidence threshold $\beta_1$ is applied, more false positives (FPs) may occur than in training 510 to which the second confidence threshold $\alpha_1$ is applied, and more false negatives (FNs) may occur than in training 510 to which the third confidence threshold $\gamma_1$ is applied.

The computing apparatus 100 may perform training 520 to which the second confidence threshold $\alpha_1$ is applied, using the updated model 230 and the first pseudo labeled data 310. For example, the computing apparatus 100 may perform training 520 of the updated model 230 through an image having a pseudo label greater than or equal to the second confidence threshold $\alpha_1$ among the plurality of images in the first pseudo labeled data 310. Since the second confidence threshold $\alpha_1$ is the largest of the confidence thresholds $\beta_1$, $\alpha_1$, and $\gamma_1$, FPs may not occur in the result of training 520. In other words, the computing apparatus 100 may perform training 520 to which the highest confidence threshold $\alpha_1$ is applied so that FPs may not occur.

The computing apparatus 100 may perform training 530 to which the third confidence threshold $\gamma_1$ is applied, using the updated model 230 and the first pseudo labeled data 310. For example, the computing apparatus 100 may perform training 530 of the updated model 230 through an image having a pseudo label greater than or equal to the third confidence threshold $\gamma_1$ among the plurality of images in the first pseudo labeled data 310. Since the third confidence threshold $\gamma_1$ is the smallest of the confidence thresholds $\beta_1$, $\alpha_1$, and $\gamma_1$, FNs may not occur in the result of training 530. In other words, the computing apparatus 100 may perform training 530 to which the smallest confidence threshold $\gamma_1$ is applied so that FNs may not occur.

The computing apparatus 100 may generate the object detection model$_1$ 550 by performing the ensemble 540 of the results of the trainings 510, 520, and 530. For example, the computing apparatus 100 may perform the ensemble 540 of the results of the plurality of trainings 510, 520, and 530 through the below example Equation 4.

Equation 4

Input: trained model of three conditions: $\{M_1, M_2, M_3\}$ (6)

Output: Ensemble model: $M_E$ $$M_E \leftarrow \frac{1}{3}\sum_{i=1}^{3} M_i^W \text{ //Ensemble model}$$

In Equation 4 above, $M_1$ may correspond to the result of training 510, $M_2$ may correspond to the result of training 520, $M_3$ may correspond to the result of training 530, and $M_E$ may correspond to the object detection model$_1$ 550.

Thus, as only an example and depending on implementation embodiment, the computing apparatus 100 may generate the object detection model$_1$ 550 by averaging respective weights of the results of the trainings 510, 520, and 530, for each weight of each of plural layers of the model. As an example, Table 1 below shows examples of weights of models trained respectively through the trainings 510, 520, and 530.

TABLE 1

| Weights of model trained through training 510 | Weights of model trained through training 520 | Weights of model trained through training 530 |
|---|---|---|
| $w_{1\_1}$ | $w_{1\_2}$ | $w_{1\_3}$ |
| $w_{2\_1}$ | $w_{2\_2}$ | $w_{2\_3}$ |
| $w_{3\_1}$ | $w_{3\_2}$ | $w_{3\_3}$ |
| ... | ... | ... |
| $w_{n\_1}$ | $w_{n\_2}$ | $w_{n\_3}$ |

The computing apparatus 100 may generate the object detection model$_1$ 550 using the corresponding weights in Table 1 above. As an example, the computing apparatus 100 may average the corresponding weights in Table 1 above. Table 1 below shows examples of average results $w_1$, $w_2$, ..., $w_n$ of the corresponding weights.

TABLE 2

$w_1 = (w_{1\_1} + w_{1\_2} + w_{1\_3})/3$
$w_2 = (w_{2\_1} + w_{2\_2} + w_{2\_3})/3$
$w_3 = (w_{3\_1} + w_{3\_2} + w_{3\_3})/3$
...
$w_n = (w_{n\_1} + w_{n\_2} + w_{n\_3})/3$

The computing apparatus 100 may generate the object detection model$_1$ 550 having the weights $w_1$, $w_2$, ..., $w_n$ of Table 2 above. As another example, the computing apparatus 100 may apply ratios to the corresponding weights of Table 1 above. The computing apparatus 100 may apply a ratio a to $w_{1\_1}$, apply a ratio b to $w_{1\_2}$, and apply a ratio c to $w_{1\_3}$. Table 3 below shows examples of results of applying such ratios to the corresponding weights.

TABLE 3

$w_1 = a \times w_{1\_1} + b \times w_{1\_2} + c \times w_{1\_3}$
$w_2 = a \times w_{2\_1} + b \times w_{2\_2} + c \times w_{2\_3}$
$w_3 = a \times w_{3\_1} + b \times w_{3\_2} + c \times w_{3\_3}$
...
$w_n = a \times w_{n\_1} + b \times w_{n\_2} + c \times w_{n\_3}$ In Table 3 above, the sum of a, b, and c is "1". The computing apparatus 100 may generate the object detection model$_1$ 550 having the weights $w_1$, $w_2$, ..., $w_n$ of Table 3 above.

The computing apparatus 100 may generate the object detection model$_2$ by performing a pseudo labeling 120, an evaluation 130, and training 140 on the object detection model$_1$ 550. As an example, the pseudo labeling 120, evaluation 130, and training 140 may correspond to the repetition of the pseudo labeling 120, evaluation 130, and training 140 of FIG. 1.

The computing apparatus 100 may generate second pseudo labeled data by performing pseudo labeling 120 based on a second training set and the object detection model$_1$ 550, e.g., a respective training set for this case of performing pseudo labeling 120 using the updated model. The second training set is a data set obtained through the image sensor 110, and may be an unlabeled data set. The second training set may be the same as or different from the training set described with reference to FIG. 3 and/or the training set that would be utilized for pseudo labeling 120 with reference to FIG. 6. The descriptions provided with reference to FIG. 3 may apply to the generation of the second pseudo labeled data, and thus a detailed description thereof will be omitted for conciseness.

The computing apparatus 100 may perform evaluation 130 on the object detection model$_1$ 550, and determine confidence thresholds $\beta_2$, $\alpha_2$, and $\gamma_2$ for the second pseudo labeled data based on a result of evaluation on the object detection model$_1$ 550. The description provided with reference to FIG. 4 may apply to the determination of the confidence thresholds $\beta_2$, $\alpha_2$, and $\gamma_2$, and thus a detailed description thereof will be omitted for conciseness.

Referring to FIG. 6, a computing apparatus 100 may perform a plurality of trainings 610, 620, and 630 using an object detection model, e.g., the object detection model$_1$ 550, and the second pseudo labeled data, such as performed with respect to FIG. 5. As an example, the computing apparatus 100 may be any one or any combination of the computing apparatuses 100 described herein, and may further be any one or any combination of any of the computing apparatuses described herein. As an example, the computing apparatus 100 may perform the plurality of trainings 610, 620, and 630 by applying the confidence thresholds $\beta_2$, $\alpha_2$, and $\gamma_2$ to the plurality of trainings 610, 620, and 630, respectively. The computing apparatus 100 may generate an object detection model$_2$ 650 by performing an ensemble 640 of the results of the plurality of trainings 610, 620, and 630. The description of the plurality of trainings 510, 520, and 530 of FIG. 5 may apply to the plurality of trainings 610, 620, and 630, and thus a detailed description thereof will be omitted for conciseness.

The computing apparatus 100 may generate an object detection model$_3$ by again performing the pseudo labeling 120, the evaluation 130, and the training 140 on the object detection model$_2$ 650. In this way, the computing apparatus 100 may generate a plurality of object detection models, and select an object detection model having a best or maximum performance from among the plurality of object detection models. The selected object detection model may be stored in various devices, such as a memory or storage device of a vehicle, other electronic, etc., and perform object detection by receiving sensing data from an image sensor mounted on or in, or connected to, such device.

In an example, the image sensor 101 may be a newly released image sensor, and have different characteristics than a previous image sensor that was used to generate the pre-trained model 102 of FIG. 2, for example. In this case, the computing apparatus 100 may efficiently and quickly generate an object detection model for the image sensor 101, e.g., without any ground truth (GT) operation (or data labeling) for the image sensor 101. In addition, the computing apparatus 100 may quickly and efficiently generate the object detection model for the image sensor 101 even when a domain, e.g., RGB, of the data set that was used to train the pre-trained model 102 is different from a domain, e.g., raw Bayer, of a sensing data 101-1, e.g., the sensing data 101-1 of FIG. 1, of the image sensor 101. In addition, the computing apparatus 100 may quickly and efficiently generate the object detection model for the image sensor 101 when the domain of the data set that was used to train the pre-trained model 102 is the same as the domain of the sensing data 101-1 of the image sensor 101, while the image sensor 101 differs from the previous image sensor for the pre-trained model 102 in type, for example, with such different distribution and/or resolution characteristics, as non-limiting examples.

Figure 7:
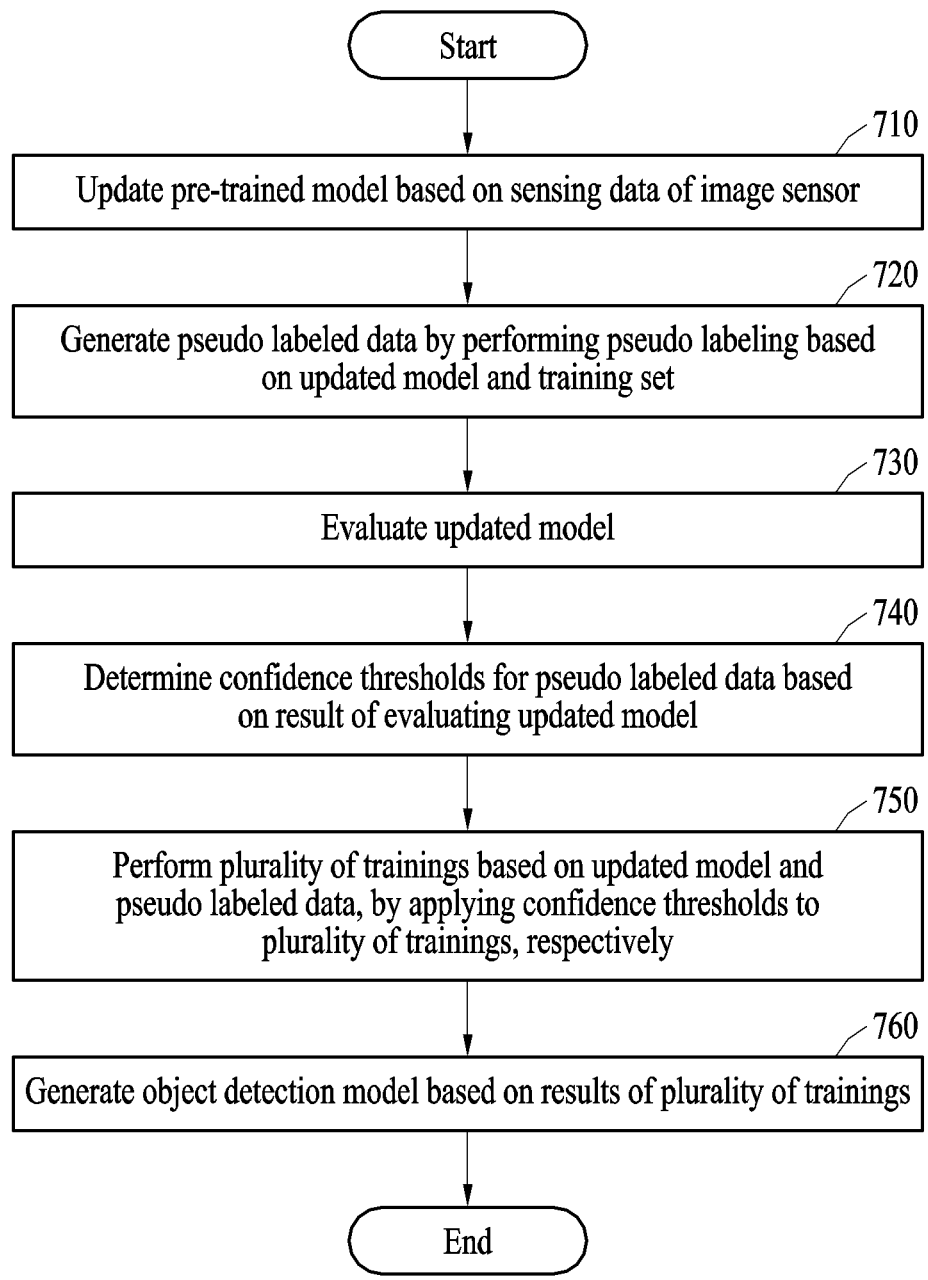
FIG. 7 illustrates an example object detection model generating method, according to one or more embodiments.

FIG. 7 illustrates an example object detection model generating method, according to one or more embodiments.

Referring to FIG. 7, in operation 710, a computing apparatus 100 may update a pre-trained model 102, e.g., the pre-trained model 102 of FIG. 1, based on sensing data 101-1 of an image sensor 101, e.g., the sensing data 101-1 of the image sensor 101 of FIG. 1. As an example, the computing apparatus 100 may be any one or any combination of the computing apparatuses 100 described herein, and may further be any one or any combination of any of the computing apparatuses described herein. As a further example, the pre-trained model 102 and the image sensor 101 may be pre-trained model 102 and the image sensor 101 of FIG. 1. The computing apparatus 100 may update a first layer of the pre-trained model 102 using the sensing data 101-1. In an example, the computing apparatus 100 may adjust the intensity distribution of the sensing data 101-1, and update the first layer of the pre-trained model 102 using the sensing data with the intensity distribution adjusted. The first layer of the pre-trained model 102 may include a batch normalization layer.

In operation 720, the computing apparatus 100 may generate pseudo labeled data by performing pseudo labeling 120, e.g., any of the pseudo labeling 120 described herein, based on an updated model and training set, e.g., the updated model 230 of FIG. 2 and a training set 301, e.g., the training set 301 of FIG. 3.

In operation 730, the computing apparatus 100 may perform evaluation 130, e.g., any of the evaluations 130 described herein, on the updated model 230.

In operation 740, the computing apparatus 100 may determine confidence thresholds for the pseudo labeled data based on a result of the evaluation on the updated model 230.

In operation 750, the computing apparatus 100 may perform a plurality of trainings using the updated model 230 and the pseudo labeled data, by applying the confidence thresholds to the plurality of trainings, respectively.

As an example, as described with reference to FIG. 5, the computing apparatus 100 may perform training, e.g., training 510, to which the first confidence threshold is applied, using the updated model 230 and the first pseudo labeled data 310. The computing apparatus 100 may perform another training, e.g., training 520, to which the second confidence threshold is applied, using the updated model 230 and the first pseudo labeled data 310, and perform still another training, e.g., training 530, to which the third confidence threshold is applied, using the updated model 230 and the first pseudo labeled data 310. While three example trainings are discussed, examples are not limited thereto.

In operation 760, the computing apparatus 100 may generate an object detection model based on the results of the plurality of trainings.

The description provided with reference to FIGS. 1 to 6 and FIGS. 8 to 11 may also apply to the description of FIG. 7, and thus a further detailed description will be omitted for conciseness.

Figure 8:
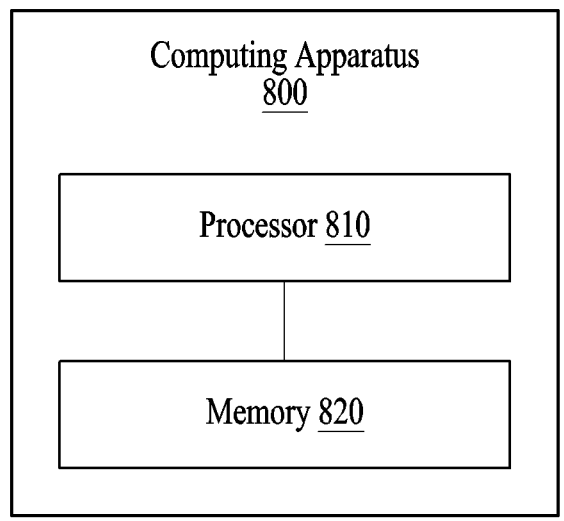
FIG. 8 illustrates an example computing apparatus, according to one or more embodiments.

FIG. 8 illustrates an example computing apparatus, according to one or more embodiments.

Referring to FIG. 8, a computing apparatus 800 may include a processor 810 and a memory 820, for example.

As an example, the computing apparatus 800 may be any one or any combination of the computing apparatuses 100 described herein, and may further be any one or any combination of any of the computing apparatuses described herein.

The processor 810 may perform a model update 110, a pseudo labeling 120, an evaluation 130, and a training 140, such as described above with reference to the model update 110, the pseudo labeling 120, the evaluation 130, and the training 140 of any one or any combination of FIGS. 1 to 7, and may further perform any operations described above with respect to any one or any combination of FIGS. 1 to 7, as well as described below with respect to any one or any combination the FIGS. 9 to 11.

The memory 820 may store information necessary for the processor 810 to perform the processing operation. As an example, the memory 820 may store instructions to be executed by the processor 810 and store sensing data 101-1, a pre-trained model 102, a training set 301, a validation set 401, e.g., the sensing data 101-1 and the pre-trained model 102 of FIG. 1, the training set 310 of FIG. 3, and the validation set 401 of FIG. 4, and the like.

The memory 820 may store a result of the processing operation of the processor 810. As an example, the memory 820 may store the updated model 230, first pseudo labeled data 310, e.g., the first pseudo labeled data 310 of FIG. 3, second pseudo labeled data, e.g., the second pseudo labeled data of FIG. 6, and the like.

Example embodiments further include the computing apparatus 800, or a combination of the computing apparatus 800 and the below computing apparatus 900 of FIG. 9, configured to perform any one, combination, or all operations described above with reference to FIGS. 1 to 7 and FIGS. 9 to 11, and thus a detailed description will be omitted for conciseness.

Figure 9:
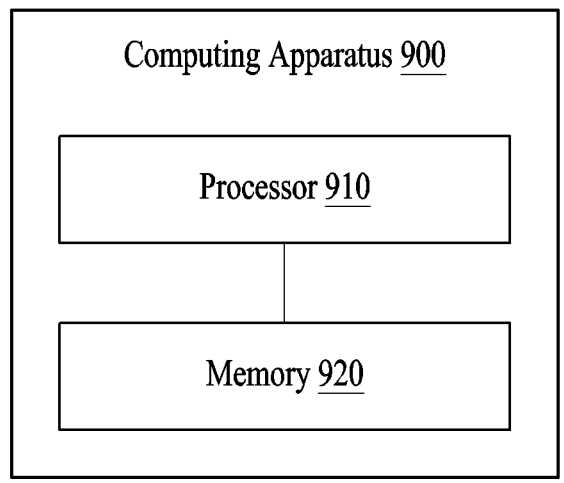
FIG. 9 illustrates an example computing apparatus, according to one or more embodiments.

FIG. 9 illustrates an example computing apparatus, according to one or more embodiments.

Referring to FIG. 9, a computing apparatus 900 may include a processor 910 and a memory 920, for example. As an example, the processor 910 may be configured to perform any one, any combination, or all operations described herein, and the memory 920 may be a memory according to any one or any combination of any of the computing apparatuses described herein.

The memory 920 stores an object detection model. The processor 910 may be configured to generate any one or a plurality of object detection models described herein through performance any one or any combination of the respective operations, e.g., a model update 110, a pseudo labeling 120, an evaluation 130, and a training 140, described above with reference to the model update 110, or with respect to any one or any combination of such operations of FIGS. 1 to 7, as well as operations of any one or any combination of other operations described above with respect to FIGS. 1 to 8 and below with respect to FIGS. 10 and 11. In an example, the generated object detection models are stored in the memory 920. In another example, those generated object detection models having a determined best performance of all or multiple generated object detection models may be stored in the memory 920, or the generated object detection models having other performances also may be stored in the memory 920.

The processor 910 receives an image from an image sensor and performs object detection using the object detection model retrieved from the memory 920 and the received image. The processor 910 may provide an object detecting result including a position, e.g., reference position such as center position or corner, etc., of a bounding box in the received image, a size (width and height) of the bounding box, a class of an object, and the like.

In an example, the processor 910 may adjust an intensity distribution of the image using the object detection model. For example, the processor 910 may receive raw sensing data from the image sensor. The object detection model may perform image adaptation on the raw sensing data. For example, an input layer of the object detection model may be configured to adjust an intensity distribution of input data through Equation 1 above. Examples are not limited thereto, and the input layer of the object detection model may be configured to perform various operations typically performed by an ISP, e.g., contrast adjustment, distortion correction, etc. The subsequent layers of the object detection model may detect an object based on the raw sensing data on adapted raw sensing data. Accordingly, in an example, the processor 910 may perform object detection based on the raw sensing data without an ISP for processing the raw sensing data of the image sensor.

Example embodiments include computing apparatus 900 being applied in various fields. For example, the computing apparatus 900 may be, or be included in, advanced driver-assistance systems (ADAS)/autonomous driving (AD) systems of a vehicle. Examples are not limited thereto, and example embodiments include the computing apparatus 900, or a combination of the computing apparatuses 800 and 900, being a surveillance system, e.g., closed-circuit television (CCTV) surveillance, or military border surveillance, a sports game analysis system, a smart campus system, a video conference system, and the like. In addition, example embodiments include the computing apparatus 900, or the combination of the computing apparatuses 800 and 900, being configured with respect to any field, system, or device with object detection.

Figure 10:
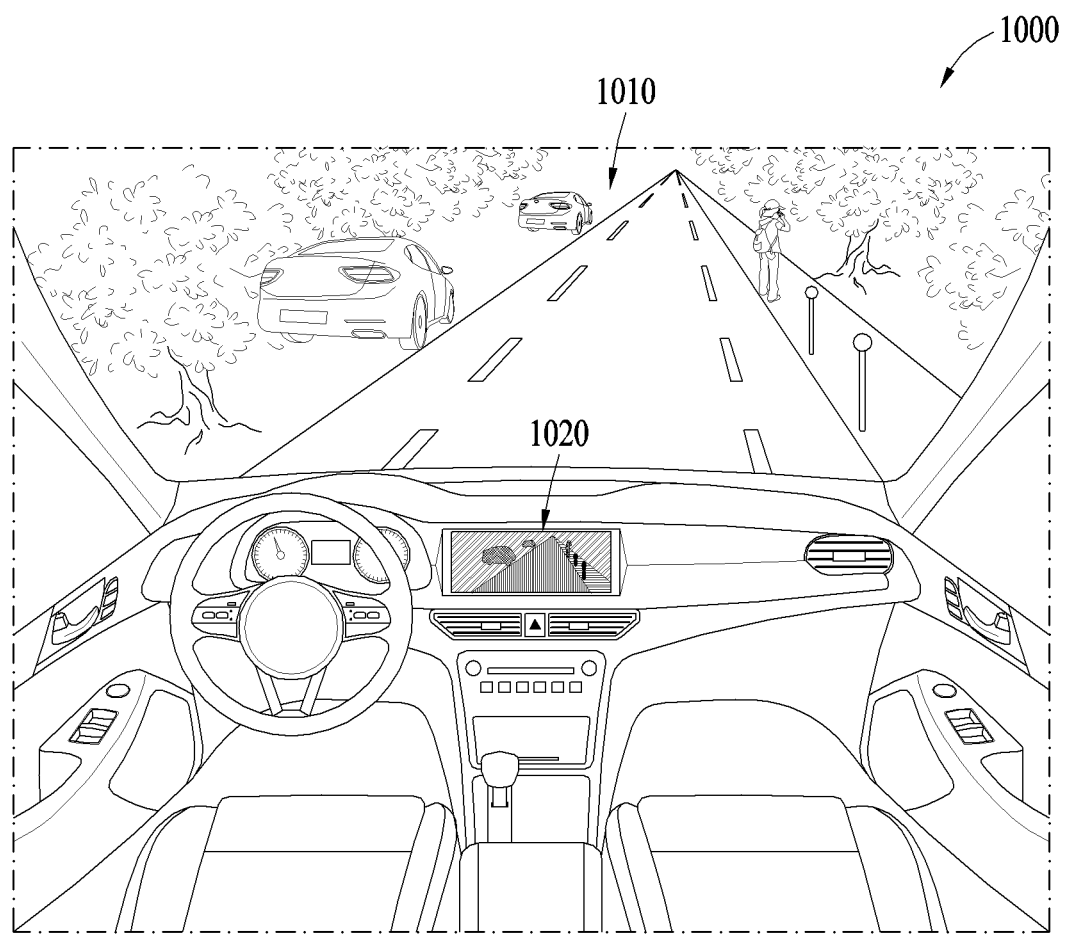
FIG. 10 illustrates an example operation of a vehicle with object detection, according to one or more embodiments.
Figure 11:
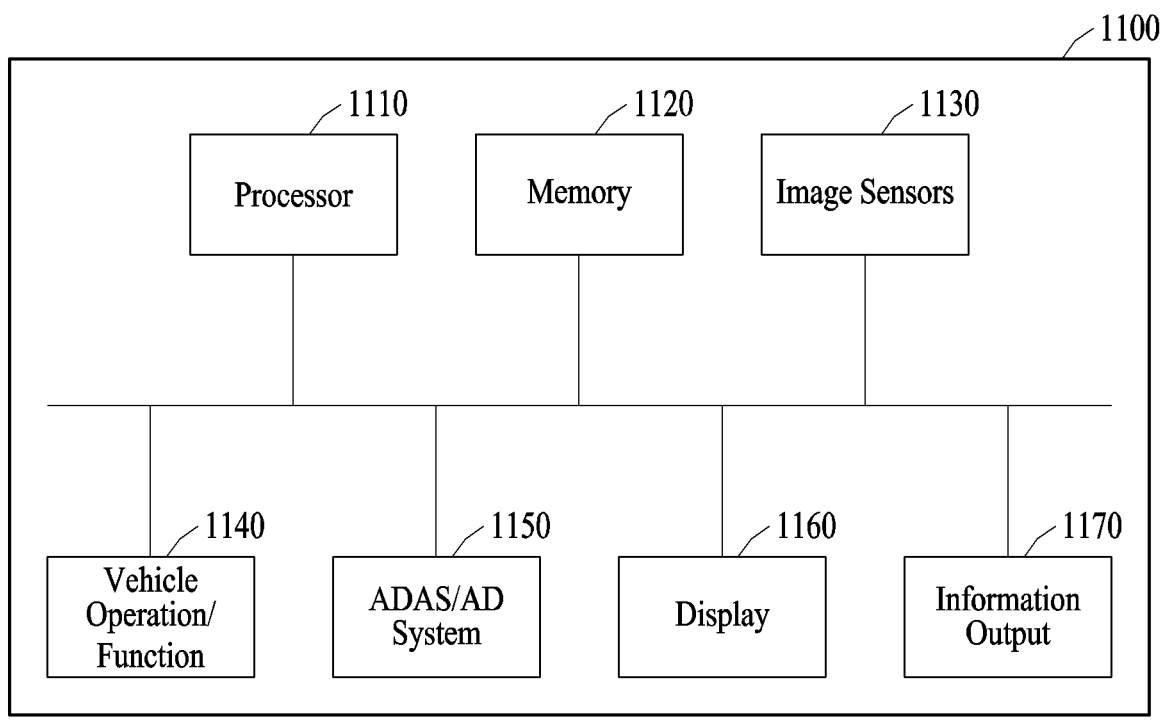
FIG. 11 illustrates an example a vehicle, according to one or more embodiments.

FIG. 10 illustrates an example operation of a vehicle with object detection, according to one or more embodiments, and FIG. 11 illustrates an example a vehicle with object detection, according to one or more embodiments.

In the examples of FIGS. 10 and 11, a computing apparatus, such as the computing apparatus 900, a combination of computing apparatuses 800 and 900, any one or any combination of the computing apparatuses 100 described herein, an ADAS/AD system mounted in/on vehicle 1000, or any combination of one or more processors 1110 and/or the ADAS/AD system 1150 of vehicle 1100, may be configured to implement any one, any combination, or all operations described herein with respect to FIGS. 1-9. In an example, the computing apparatus may be the vehicle 1000 or vehicle 1100, having one or more processors and/or one or more ADAS/AD systems, e.g., one or more processors 1110 and/or one or more ADAS/AD systems 1150, among all processors, e.g., among all processors 1110, of the vehicle 1000 or vehicle 1100, configured to implement any one, any combination, or all operations described herein with respect to FIGS. 1-11. In another example, the ADAS/AD system of vehicle 1000 or the ADAS/AD system 1150 of vehicle 1100 may include the computing apparatus 900 or a combination of the computing apparatuses 800 and 900, as non-limiting examples. The ADAS/AD systems of the vehicle 1000 may further include an image sensor, or the image sensor may be otherwise mounted in/on the vehicle 1000. For example, the image sensors 1130 of the vehicle 1100 may be separate from the ADAS/AD system 1150 and in communication with the ADAS/AD system 1150. In an example, one or more processors 1110 of the vehicle 1100 in FIG. 11 may perform some or all same operations or functions of such an ADAS/AD system of the vehicle 1000, and/or some or all such ADAS/AD operations or functions may be performed by the ADAS/AD system 1150 of FIG. 11.

The memory 1120 of the vehicle 1100 stores one or more object detection models, among any one or any combination of all models and data described herein with respect to captured, training, labeled, or pseudo-labeled images, as well as any sensing data with respect to the image sensors 1130, as non-limiting examples. For example, one or more of the processor 1110 may be configured to generate any one or a plurality of object detection models described herein through performance any one or any combination of respective operations, e.g., a model update 110, a pseudo labeling 120, an evaluation 130, and a training 140, described above with reference to the model update 110, the pseudo labeling 120, the evaluation 130, and the training 140 of any one or any combination of the descriptions with respect to FIGS. 1 to 7, as well as operations of any one or any combination of any other operations described above with respect to FIGS. 1 to 11. In an example, the previous and generated object detection models are stored in the memory 1120. In addition, the memory 1120 and/or the memory of the ADAS/AD system 1150 may store instructions, which when executed by the processor, e.g., one or more processors 1110, or the processor, e.g., one or more processors, of the ADAS/AD system 1150, configure the corresponding processor(s) to perform and implement one or more or all operations described herein. Additionally, the memory 1120 may store additional instructions for additional operations for the driving and/or other functions of the vehicle 1100, which when executed by one or more processors of the processor 1110 (or another one or more processors or controllers of the vehicle 1100), configure the corresponding processor(s) to perform and implement such additional operations of the vehicle 1100.

The ADAS/AD systems of the vehicle 1000 and the ADAS/AD system 1150 of vehicle 1100 may generate information associated with the traveling of the vehicle 1000 and vehicle 1100, respectively. The information associated with the traveling of the vehicle 1000 may be data used to assist in the traveling of the vehicle 1000 or used for the traveling of the vehicle 1000, and include, for example, route guidance information, danger warning information, e.g., information about an accident such as a collision, road condition information, e.g., road congestion, and surrounding environment information. Such information may also be generated and/or provided by the ADAS/AD system 1150 and/or the information output 1170 of FIG. 11, e.g., using speakers or other optical indicators represented by the output of such information output 1170. The ADAS/AD systems of the vehicle 1000 may also visually display the information associated with the traveling through a display 1020 of the vehicle 1000, and one or more of the processors 1110, the ADAS/AD system 1150, and/or the information output 1170 of vehicle 1100 may control the visual display this information, among other information, through the display 1160 of vehicle 1100.

The image sensor in the vehicle 1000 of FIG. 10, and one or more of the image sensors 1130 of the vehicle 1100 of FIG. 11, may generate input images corresponding to one or more scenes, e.g., one or more scenes 1010, of a vicinity or environment of the vehicle 1000 or vehicle 1100, by capturing the input images, the input images may be in raw image form, as only an example. The computing apparatus may detect an object from the input image.

The ADAS/AD systems of the vehicle 1000 and the ADAS/AD system of 1150, and/or one or more processors 1110 of the vehicle 1100, may perform or control autonomous driving based on a result of object detection by the computing apparatus. For example, the ADAS/AD systems of the vehicle 1000 may perform any one or any combination of speed control, acceleration control, and steering control of the vehicle 1000, as non-limiting examples. Likewise, as an example, the ADAS/AD system 1150 of the vehicle 1100 may perform any one or any combination of speed control, acceleration control, and steering control of the vehicle 1100, e.g., based on corresponding control or instructions from the ADAS/AD system 1150 to the vehicle operation/function 1140 of the vehicle 1100 to implement such physical controls of the speed, acceleration, and steering of the vehicle 1100. For example, the ADAS/AD systems of the vehicle 1000 or the ADAS/AD system 1150 of vehicle 1100 (or combination of the ADAS/AD system 1150 and the vehicle operation/function 1140) may calculate a distance to an object existing in the vicinity or environment of the vehicle 1000 or vehicle 1100, and control, cause, or perform any one or any combination of the speed changes, e.g., increase or decrease, the acceleration changes, e.g., increase or decrease, and the steering changes for the vehicle 1000 or the vehicle 1100 based on the distance to the object, as non-limiting examples.

The computing apparatuses, the vehicles, the electronic devices, the processors, the memories, the image sensors, the vehicle/operation function hardware, the ADAS/AD systems, the displays, the information output system and hardware, the storage devices, and other apparatuses, devices, units, modules, and components described herein with respect to FIGS. 1-11 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A processor-implemented method, the method comprising:
    updating a pre-trained model based on sensing data of an image sensor;
    performing pseudo labeling using an interim model provided a respective training set;
    determining plural confidence thresholds based on an evaluation of the interim model;
    performing multiple trainings using the interim model and the generated pseudo labeled data, by applying the determined plural confidence thresholds to the multiple trainings, respectively; and
    generating an object detection model dependent on the performance of the multiple trainings, including generating an initial candidate object detection model when the interim model is the updated model, wherein the determining of the plural confidence thresholds comprises:
    determining a first confidence threshold, of the plural confidence thresholds, used to determine a highest evaluation score of evaluation scores of the interim model;
    determining a second confidence threshold, of the plural confidence thresholds, greater than the determined first confidence threshold; and
    determining a third confidence threshold, of the plural confidence thresholds, less than the determined first confidence threshold,
    wherein the generating of the object detection model comprises generating the initial candidate object detection model by averaging respective weights that result from the multiple trainings for each weight of each of plural layers of the interim model when the interim model is the updated model.

2. The method of claim 1, wherein the updating of the pre-trained model comprises updating a first layer of the pre-trained model using the sensing data.

3. The method of claim 2, wherein the first layer is a batch normalization layer.

4. The method of claim 1, wherein the updating of the pre-trained model comprises performing image adaptation on the sensing data.

5. The method of claim 4, wherein the performing of the image adaptation on the sensing data comprises adjusting an intensity distribution of the sensing data.

6. The method of claim 1, wherein the pre-trained model is based on corresponding sensing data in a different format than the sensing data, and
    wherein the updating of the pre-trained model comprises converting the sensing data into the different format.

7. The method of claim 1,
    wherein each of the multiple trainings includes an implementing of the interim model, provided the generated pseudo labeled data, using a different confidence threshold, of the determined plural confidence thresholds, for obtaining a respective labeling result of the implemented interim model, and wherein each of the multiple trainings includes additional training based at least on the respective labeling result.

8. The method of claim 7, wherein the pre-trained model is based on sensing data of another image sensor having different characteristics than the image sensor.

9. The method of claim 7, wherein the multiple trainings are collectively repeated a plurality of times, after an initial time of the plurality of times when the interim model is the updated model, with the interim model being a previous candidate object detection model generated, in the generating of the object detection model, at an immediately previous time of the plurality of times, wherein the generating of the object detection model further includes generating another candidate object detection model at a final time of the plurality of times, and wherein the previous candidate object detection model at a time immediately after the initial time is the initial candidate object detection model.

10. The method of claim 9, wherein the generating of the object detection model includes selecting the object detection model from among plural candidate object detection models based on performance comparisons between the plural candidate object detection models, where the plural candidate object detection models include the initial candidate object detection model, the previous candidate object detection models respectively generated at the plurality times, except at a time of the plurality of times immediately after the initial time, and the other candidate object detection model.

11. The method of claim 10, further comprising performing, by a vehicle, object detection using the generated object detection model provided an image captured by the image sensor.

12. The method of claim 9, wherein the evaluating of the interim model comprises determining a plurality of evaluation scores from respective implementations of the interim model using a plurality of thresholds and a respective validation set.

13. The method of claim 9, wherein the multiple trainings at each of the plurality of times have respective trained model results, wherein, at each of the plurality of times, the generating of the object detection model generates a corresponding candidate object detection model by performing an ensemble of the respective trained model results.

14. The method of wherein the evaluating of the interim model comprises determining a plurality of evaluation scores from respective implementations of the interim model using the plural confidence thresholds and a respective validation set.

15. The method of claim 14, wherein the performing of the multiple trainings comprises:

performing a first training to which the determined first confidence threshold is applied using the interim model and the generated pseudo labeled data;

performing a second training to which the determined second confidence threshold is applied using the interim model and the generated pseudo labeled data; and performing a third training to which the determined third confidence threshold is applied using the interim model and the generated pseudo labeled data.

16. The method of claim 1, wherein the performing of the pseudo labeling using the interim model includes:

generating first pseudo labeled data by performing the pseudo labeling based on the updated model and a first unlabeled training set as the respective training set; and generating second pseudo labeled data by performing the pseudo labeling based on the initial object detection model and a second unlabeled training set as the respective training set;

evaluating the initial candidate object detection model;

determining confidence thresholds for the generated second pseudo labeled data based on a result of evaluating the initial candidate object detection model;

performing multiple second trainings, among the multiple trainings, using the initial candidate object detection model and the generated second pseudo labeled data, by applying the confidence thresholds for the generated second pseudo labeled data to the multiple second trainings, respectively; and generating, in the generating the object detection model, a second candidate object detection model using results of the multiple second trainings, wherein the first unlabeled training set and the second unlabeled training set are same or different training sets.

17. The method of claim 16, further comprising:

repeating a plurality of times, after the generating of the initial candidate object detection model and except for an initial time of the plurality of times when the second candidate object detection model is generated:

the performing of the pseudo labeling using, as the interim model at a corresponding time of the plurality of times, a previous candidate object detection model generated, in the generating of the object detection model, at an immediately previous time of the plurality of times;

the evaluating of the interim model, at the corresponding time;

the performing of the multiple trainings, at the corresponding time, with respect to the interim model; and a generating, in the generating the object detection model at the corresponding time, another candidate object detection model based on results of the multiple trainings at the corresponding time; and generating the object detection model by selecting the object detection model from among plural candidate object detection models based on performance comparisons between the plural candidate object detection models, where the plural candidate object detection models include the initial candidate object detection model, the previous candidate object detection models at the immediately previous times, and the other candidate object detection model at a final time of the plurality of times.

18. An apparatus, the apparatus comprising:

a memory configured to store an object detection model; and a processor configured to perform object detection using an image from an image sensor and the object detection model, wherein, for the generation of the object detection model, the processor is configured to:

update a pre-trained model based on sensing data of the image sensor;

perform pseudo labeling using an interim model provided a respective training set, to generate pseudo labeled data;
determine plural confidence thresholds based on an evaluation of the interim model;
perform multiple trainings using the interim model and the generated pseudo labeled data, by applying the determined plural confidence thresholds to the multiple trainings, respectively; and
generate the object detection model dependent on the performance of the multiple trainings, including generating a candidate object detection model when the interim model is the updated model,
wherein the determination of the confidence thresholds comprises:
a determination of a first confidence threshold used to determine a highest evaluation score of the determined evaluation scores;
a determination of a second confidence threshold greater than the determined first confidence threshold; and
a determination of a third confidence threshold less than the determined first confidence threshold,
wherein the processor is configured to generate the object detection model by generating the initial candidate object detection model by averaging respective weights that result from the multiple trainings for each weight of each of plural layers of the interim model when the interim model is the updated model.

19. The apparatus of claim 18, wherein the update of the pre-trained model comprises updating a first layer of the pre-trained model using sensing data of another image sensor that has same characteristics as the image sensor.

20. The apparatus of claim 19, wherein the first layer is a batch normalization layer.

21. The apparatus of claim 18, wherein the update of the pre-trained model comprises performing image adaptation on the sensing data.

22. The apparatus of claim 18, wherein the processor is further configured to perform the evaluation by determining a plurality of evaluation scores for the interim model using the plural confidence thresholds and a respective validation set.

23. The apparatus of claim 22, wherein, for the performing of the multiple trainings, the processor is configured to:
perform a training to which the determined first confidence threshold is applied using the interim model and the generated pseudo labeled data;
perform a training to which the determined second confidence threshold is applied using the interim model and the generated pseudo labeled data; and
perform a training to which the determined third confidence threshold is applied using the interim model and the generated pseudo labeled data.

24. The apparatus of claim 18, wherein the processor is further configured to adjust an intensity distribution of the image using the object detection model.

25. The apparatus of claim 24, further comprising the image sensor.

26. The apparatus of claim 25, wherein the apparatus is a vehicle.

* * * * *